Feb. 14, 1956 H. D. STUCK 2,734,261

PROCESS OF REPAIRING JORDAN PLUGS

Filed July 28, 1952

INVENTOR.
Harold d. Stuck
BY
Pearson & Pearson
Attorneys.

United States Patent Office 2,734,261
Patented Feb. 14, 1956

2,734,261

PROCESS OF REPAIRING JORDAN PLUGS

Harold D. Stuck, Andover, Mass., assignor to John W. Bolton & Sons, Inc., Lawrence, Mass., a corporation of Massachusetts Application July 28, 1952, Serial No. 301,275

1 Claim. (Cl. 29—401)

This invention relates to the plugs of Jordan engines such as shown in patent to Bolton, No. 1,829,630 of October 27, 1931, and in patent to Stuck, No. 2,366,367 of January 2, 1945.

This application is also a continuation in part of my application filed December 17, 1947, Serial No. 792,289 on Jordan Engine Plug Construction, now Patent No. 2,610,554.

Jordan plugs are of truncated conical form and heretofore have each been made of a hollow casting, supporting one or more annular bosses and bands, with slots to carry bars, or, sometimes, there is a skeleton body made up of annular spiders and sometimes the bars are part of a complete casting. The truncated conical headed casting with no spiders or such supporting spiders alone constitute a supporting body for holding outwardly extending longitudinally extending cutting bars.

The purposes of this invention are to provide for means of remaking Jordan plugs of the type shown in the Bolton patent or in the Stuck patent and providing an outside, hollow truncated conical jacket or surface member which preferably has longitudinal grooves in which plug bars can be fixed.

The particular object of the invention is to provide a process for repairing existing Jordan plugs by first cutting away all of the bar, or knife, retaining means on the curved plug surface, then covering the curved surface by forming flat patterns of segments of a truncated cone, bending the segments to shape and edge welding them into a unitary jacket and finally milling the jacket with wedge shaped grooves to support new bars against the stress and strain of centrifugal force, resulting from the high speed of a Jordan plug.

This jacket member is made of a plurality of outside cone sections each of which is made of a high grade stainless steel or steel, bronze or other suitable metal which may be rolled or otherwise shaped, such outside cone sections extending around and forming the curved outside member of the plug. The sides or side edges of these sections are seam welded together and they, as parts of the outside member, are welded, as by plug welding, to the supporting body, which may be one of several types.

In the drawings, Fig. 1 is a sectional detail view on a plane perpendicular to the axis of a Jordan plug of the type shown in patent to Bolton, No. 1,829,630 of October 27, 1931, before being repaired.

Figure 1:
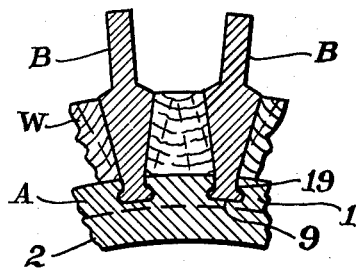
Figure 2:
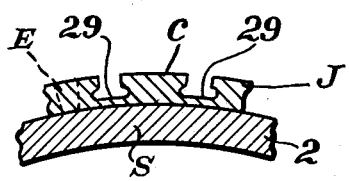
Fig. 2 is a similar view of the same plug after being repaired, omitting the bars and separators, but having new slots for bars.
Figure 4:
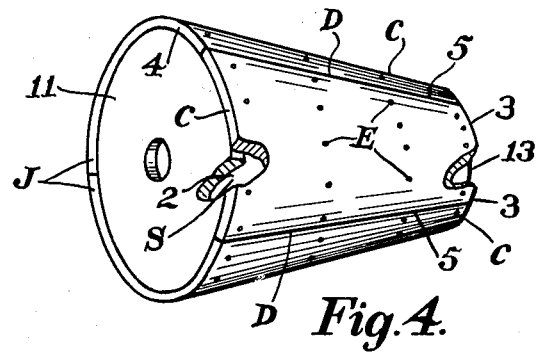
Figure 8:
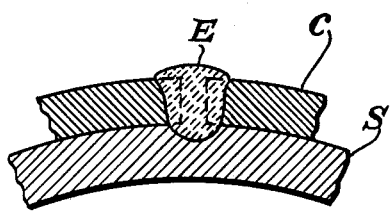

In the drawings in every case S indicates a truncated conical supporting body which may be of the type indicated in Fig. 1 where a plug body of the type shown by Bolton, No. 1,829,630 includes a hollow slotted truncated conical outside part indicated by 1 which when cut off at the dotted line, leaves an inside part 2 which, as shown in Figs. 2, 4 and 8, becomes the inside part or supporting member S for an outside member C which may also be supported by heads 11 and 13. Outside A has slots 9 for the inner edges 19 of bars B of the type shown, with wood separators W between them.

I can reuse this type of old plug by removing the bars and separators and then cutting off the part 1, which includes the slots 9, down to the dotted line in Fig. 1, thus leaving part 2 which together with the heads 11 and 13 form what I will then call the supporting body and indicate as a unit by S.

Figure 3:
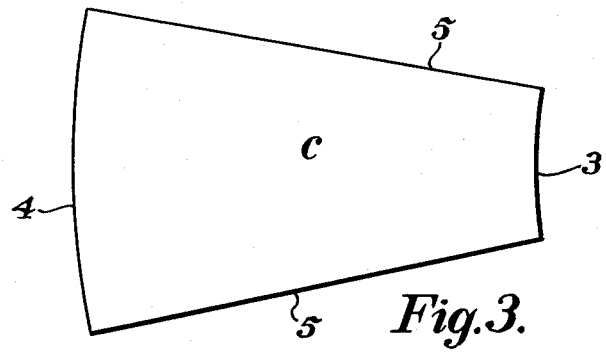
Fig. 3 is a plan view of a section of an outside member before being shaped and Fig. 4 is an isometric view of three such members shaped, attached together and to a supporting member, but not slotted.
Figure 7:
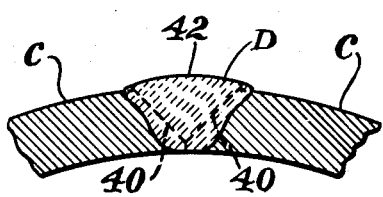
Fig. 7 is a diagrammatic view of a continuous seam weld and Fig. 8 is a diagrammatic view of a plug weld.

In every case C will indicate a cone section of metal, preferably stainless steel, shaped as a part of a hollow truncated cone, which will be a new outside cone member or jacket J for the repaired plug. Fig. 3 shows a flat blank for a section C before bending. Each section C has a large curved end 4 which when bent fits outside an arc of the large end 11 of the supporting body S and another small curved end 3 which when bent fits outside an arc of the small end 13 of the supporting body. Each section C has substantially straight side edges or sides 5, 5. This construction is shown generally in Fig. 4 where 4 indicates the large curved end and 3 the small curved end and 5 indicates the straight adjoining side edges which are welded together as at D, Fig. 4, preferably by seam welding such as shown in Fig. 7. In Fig. 8, E indicates the plug welding of a section C to a supporting member S.

Figure 6:
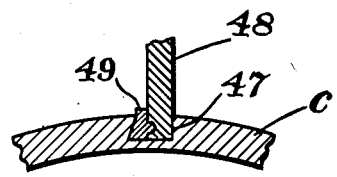
Fig. 6 is a diagrammatic sectional view of a slot and other parts which can be used in attaching bars to a type of plug such as shown in patent to Stuck, No. 2,366,367 of January 2, 1945.

This is the process of repairing or remodelling a plug of the Bolton type and after completing a new outside cone or jacket with a plurality of such cone sections C, C as shown in Fig. 2, I mill slots 29 similar to 9 for bars, such as B, or I might mill slots such as 47 shown in Fig. 6. Such slots may be long or short and are milled longitudinally to receive such bars as shown at B.

The slots 29 are so made that the outside of each slot or same part near the outside is narrower or smaller than some parts near the inside of the slot whereby, as this inside part of the bar is made to fit, each bar when driven in from the end is rigidly held in position.

Figure 5:
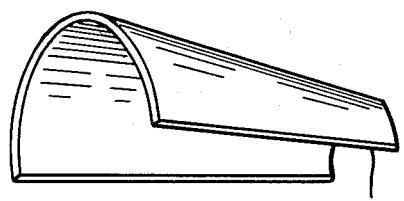
Fig. 5 is an isometric view of two cut and shaped sections of an outside member before attaching to a plug.

In the construction shown in Figs. 3 and 4, there are three sections such as C but in Fig. 5, two such sections are shown.

In every case, however, the cone sections C are welded and become a single outside member or jacket and fit the inside supporting member such as S and are welded thereto and together. When a hollow truncated conical outside member is complete and welded to a supporting body, slots such as 29, Fig. 2, are milled in it so as to fit bars such as B or slots 47 for bars 48 and wedges 49 may be used as shown in Fig. 6.

The slots are narrower or smaller at the outside and at some part of the inside, as shown in Figs. 1, 2 and 6, and the interior edges of the bars are of the same size and shape as shown in Fig. 1 both being straight in a lengthwise direction so that a single bar B, Fig. 1 or a compound bar 48 with key 47, Fig. 6 can be driven in lengthwise in a close drive fit at all points, substantially the entire length of the jacket or curved outside member of the plug.

Instead of using rolled stainless or other steel, I can use rolled manganese bronze, rolled Monel or other weldable metal.

Fig. 7 is a lateral cross section of a continuous seam weld D between two sections C, C, 40, 40 representing the original side edges of each section and 42 the welding material which holds them together. The dotted lines represent the adjoining edges before seam welding and the curved full lines after welding.

Fig. 8 shows a well known type of plug weld E between a cone section C and a support S.

When a body for a Jordan engine plug has been turned down to the form on its surface of a truncated cone and two or more sections of rolled metal are cut to fit and bent to fit such surface, it is obvious that each such section can be placed on and fitted to such surface and the sides of adjoining sections can be then welded to each other and to the body of the plug at its surface.

I claim:

The process of repairing a truncated conical Jordan engine plug of the type having means formed integrally with the curved metal surface portion thereof, for retaining the plug bars which process comprises the steps of first removing the existing plug bars; then removing the existing plug bar retaining means of said plug by cutting away the metal surface portion thereof to a predetermined substantial depth in a radial direction to form a completely new smooth unobstructed curved surface thereon of substantially reduced radius; then forming a truncated conical sleeve of stainless steel, of uniform thickness, equal in depth to the depth of the above mentioned cut on, and in intimate covering contact with, the new surface of said plug while simultaneously welding said stainless steel sleeve sections to each other and to portions of said surface; then milling longitudinally extending, spaced, wedge shaped grooves in the exterior of said stainless steel sleeve and then inserting, and wedging, new plug bars in the grooves of said stainless steel sleeve.

References Cited in the file of this patent
UNITED STATES PATENTS

| | | |
|---|---|---|
| 235,844 | Abbe | Dec. 28, 1880 |
| 946,752 | Bahr | Jan. 18, 1910 |
| 2,219,085 | Watson | Oct. 22, 1940 |
| 2,363,224 | Bronander | Nov. 21, 1944 |
| 2,426,920 | Bronander | Sept. 2, 1947 |